Patented June 28, 1932

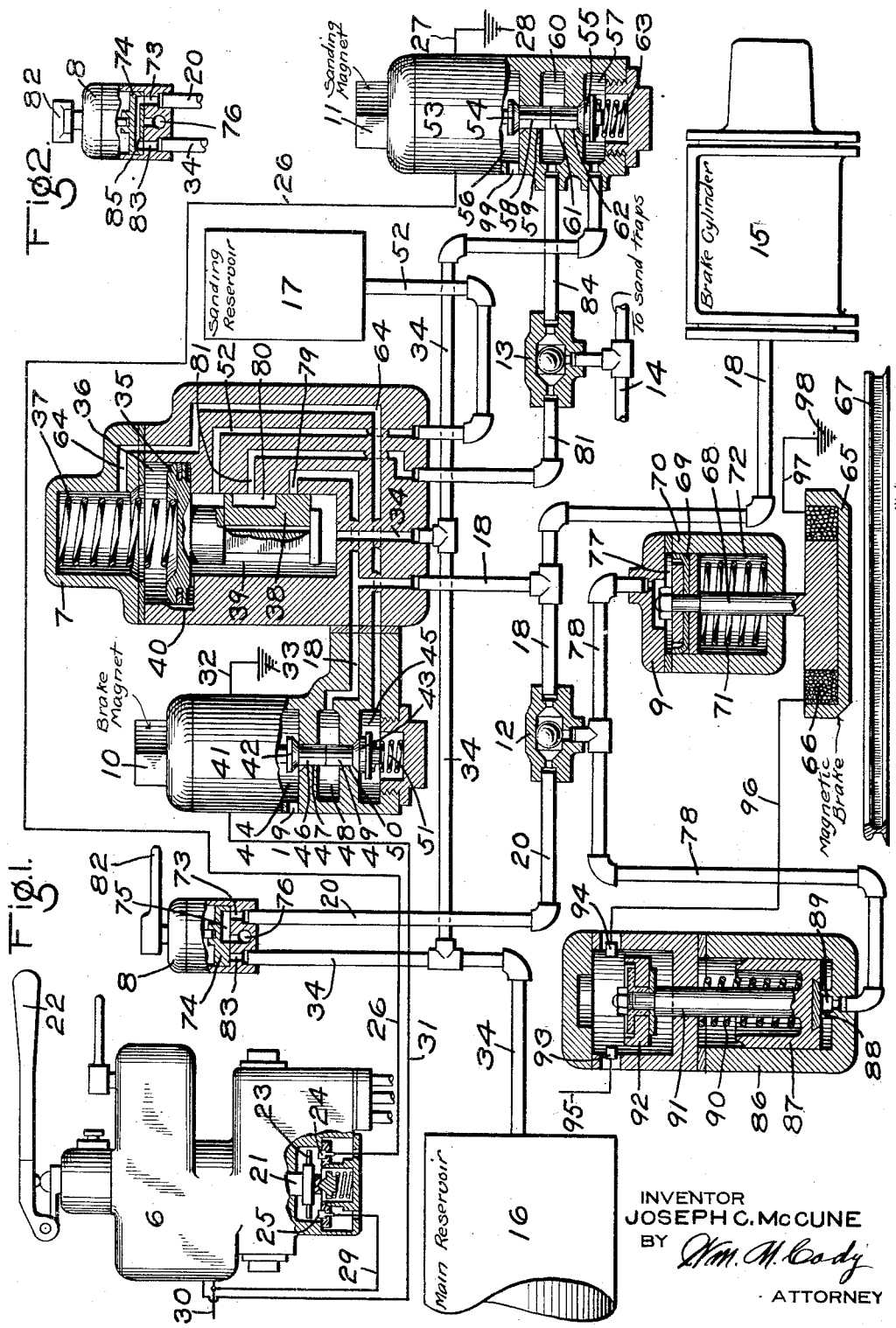

1,865,124

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

BRAKE DEVICE

Application filed March 9, 1929. Serial No. 345,776.

This invention relates to brake devices and more particularly to electro-pneumatic safety car equipment.

An object of the invention is to provide brake equipment in which the usual air brake apparatus is combined with magnet brake means and sanding mechanism so that the air brake apparatus, magnet brake means, and sanding mechanism may be simultaneously operated, or may be independently operated.

Another object of the invention is to provide an electro-pneumatic safety car equipment in which magnetic brake means are so connected to sanding mechanism that automatic operation of the magnetic brake means and sanding mechanism is obtained in an application of the brakes.

Another object of the invention is to provide an improved electro-pneumatic safety car equipment of the character mentioned which is relatively simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing; Figure 1 is a diagrammatic view, partly in section, of an electro-pneumatic safety car equipment embodying the invention; and Fig. 2 is a view of the manually operated control valve device shown in Fig. 1, illustrating another position of the valve.

Referring to the drawing, the equipment may comprise an electropneumatic brake switch device 6, for controlling the brakes electrically and pneumatically; a valve device 7, for effecting the pneumatic application of the brakes; a manually operated valve 8, for controlling the supply of fluid under pressure independently of the brake switch device 6; a magnetic brake device 9; an application magnet valve device 10; a sanding magnet valve device 11, for controlling the operation of the sand trap independently of the brake apparatus; a check valve device 12, for controlling communication to the magnetic brake device 9, a check valve device 13, for controlling communication to the sand traps (not shown), a brake cylinder 15, a main reservoir 16, and a sanding reservoir 17.

The brake switch device 6 may be of any approved construction. In the present instance it is shown as comprising a casing containing a shaft 21 which is adapted to be operated by a lever handle 22 for the purpose of bringing a disc 23, carried by the shaft, into engagement with contact members 24 and 25. Only so much of the brake switch device 6 has been illustrated as is deemed necessary to clearly understand the invention, inasmuch as the device has been shown and described in detail in my Patent No. 1,711,645 of May 7, 1929.

The contact 24 is connected by a wire 26 to one terminal of the magnet valve device 11, the other terminal of said magnet valve device being connected by a wire 27 to a ground 28.

On the other hand, the contact 25 is connected by a wire 29 to a current supply wire 30 leading to the brake switch device 6.

The magnet valve device 10 is supplied with current by a wire 31, leading from the brake switch device 6 and connected to one terminal of said magnet valve device, the other terminal of this magnet valve device being connected by a wire 32 to a ground 33.

The application valve device 7 comprises a piston 35 contained in a piston chamber 36 and subject to the pressure of a spring 37, which piston is adapted to operate a slide valve 38 contained in a valve chamber 39.

The magnet valve device 10 may comprise a magnet 41 and valves 42 and 43 adapted to be operated by said magnet. The valve 42 is contained in a chamber 44, while the valve 43 is contained in a chamber 45. The valve 42 has a fluted stem 46 extending through a suitable bore 47 in the casing and engaging in a chamber 48, a fluted stem 49 of the valve 43. The fluted stem 49 is mounted in a suitable bore 50 formed in the casing between the chambers 45 and 48. A spring 51, contained in chamber 45, acts on the valve 43, tending to seat the same and unseat the valve 42.

The magnet valve device 11 may be similar in construction to the magnet valve device 10, and comprises a magnet 53 and valves 54 and 55 adapted to be operated by said magnet. The valve 54 is contained in a chamber 56, while the valve 55 is contained in a chamber 57. The valve 54 has a fluted stem 58 extending through a suitable bore 59 in the casing and engaging in a chamber 60, a fluted stem 61 of the valve 55. The fluted stem 61 is mounted in a suitable bore 62 formed in the casing between the chambers 57 and 60. A spring 63, contained in chamber 57, acts on the valve 55, tending to seat the same and unseat the valve 54.

The magnetic brake device 9 may comprise a magnetic brake shoe 65, having a magnet coil 66 and being suspended over the rail 67 by means of a rod 68. The upper end of the rod 68 is provided with a piston 69 which is contained in a cylinder 70, that is suitably mounted on the vehicle.

A coil spring 71 is disposed in a chamber 72 and acts on the piston 69, so as to normally maintain the brake shoe 65 in its suspended position.

A switch device for controlling the circuit of the brake shoe magnet 66 is also provided, comprising a casing 86 containing a valve piston 87 adapted to seat on a seat rib 88, the space within the seat rib being connected to a pipe 78.

A coil spring 90 urges the valve piston 87 to its seat and said piston is provided with a stem 91 carrying at its outer end a switch contact 92, adapted when moved upwardly from the position shown in Fig. 1, to connect contacts 93 and 94 for closing a circuit from a source of current through the magnet coil 66. For this purpose, a wire 95 leading from the current supply is connected to the contact 93, while the contact 94 is connected to one terminal of the magnet coil 66 by a wire 96. The other terminal of the magnet coil 66 is connected by a wire 97 to a ground 98.

In operation, with the equipment charged with fluid under pressure, and the valves 6 and 8 in release position, as shown, the magnet 41 of the magnet valve device 10, and the magnet 53 of the magnet valve device 11 will be deenergized. Deenergization of the magnets 41 and 53 permits the springs 51 and 63 to respectively shift the valves 43 and 55 to their upper positions, in which the valves 42 and 54, respectively, will be unseated.

With the valve 42 unseated, the brake cylinder 15 will be vented to the atmosphere through pipe and passage 18, chamber 48 of the magnet valve device 10, bore 47, chamber 44, and exhaust port 19. The brake cylinder 15 will also be vented to the atmosphere through the ball check valve 12, pipe 20, port 73 in the seat of the rotary valve 74 of the manually operated valve 8, valve cavity 75, and exhaust port 76.

Likewise, chamber 77 on the side of the piston 69 of the magnetic brake device 9 opposite the chamber 72, will be vented to the atmosphere through pipe 78, ball check valve 12, pipe 20, port 73, valve cavity 75, and exhaust port 76 of the manually operated valve 8, as well as through pipe and passage 18 leading from the ball check valve 12, chamber 48 of the magnet valve device 10, bore 47, past unseated valve 42, chamber 44 and exhaust port 19.

The fluid under pressure in the main reservoir 16 will be supplied to the valve chamber 39 of the application valve device 7, through pipe and passage 34. Chamber 57 of the magnet valve device 11 will also be charged with fluid under pressure from the reservoir 16 through pipe 34.

Fluid under pressure flows from the valve chamber 39 of the application valve device 7 through feed groove 40 to piston chamber 36. Since the pressure of the fluid in chambers 36 and 39 will be substantially equal, spring 37 will maintain the piston 35 and the slide valve 38 in the normal position, as shown in Fig. 1 of the drawing. With the piston 35 and slide valve 38 in this position, the sanding reservoir 17 will be charged with fluid under pressure from the chamber 39 through passage and pipe 52.

When it is desired to effect an application of the brakes, the handle 22 of the brake switch device 6 is moved to service position, in which the magnet 41 of the magnet valve device 10 will be energized by current supplied by the wire 31, in the manner described in my aforesaid pending application for Letters Patent, Serial No. 248,334, filed January 21, 1928.

Energization of the magnet 41 seats the valve 42 and unseats the valve 43, and the fluid under pressure in chamber 36 of the application valve device 7 is permitted to flow simultaneously to the brake cylinder 15 and to the chamber 77 of the magnetic brake device 9. The fluid flows to the brake cylinder 15 from the chamber 36, through passage 64, chamber 45, bore 50, chamber 48, and passage and pipe 18. The pressure of the fluid in pipe 18 will shift the ball check valve 12 to the left, thereby permitting the fluid under pressure from the piston chamber 36 to flow through the pipe 78 into the chamber 77 of the magnetic brake device 9, and also to the chamber 89 of the switch device.

The rate at which the fluid flows from the piston chamber 36 will be greater than the rate at which the fluid flows from the valve chamber 39 through the feed groove 40 into the piston chamber 36. Therefore, when the pressure of the fluid in the piston chamber 36 is reduced a predetermined amount, the pressure of the fluid in the valve chamber 39 will force the piston 35 outwardly, shifting the position of the valve 38, and compressing the spring 37.

With the piston 35 and the slide valve 38 in their outer position, port 79 will be uncovered by the end of the slide valve, thereby permitting the fluid under pressure in the main reservoir 16 to flow through the passage and pipe 34, valve chamber 39, and passage and pipe 18, to the brake cylinder 15 and through the pipe 78 to the chamber 77 of the magnetic valve device 9 and to the chamber 89.

In this way the brake cylinder 15 will be operated in the usual well known manner to effect a pneumatic application of the brakes, and when the fluid under pressure supplied to the chamber 77 has been increased a predetermined amount, the piston 69 will be actuated so as to move the brake shoe 65 into engagement with the rail 67 and cause a braking effect on the vehicle by the frictional engagement of the shoe with the rail.

Owing to the restricted area of the switch piston 87 which is open to the pressure in pipe 78 when the piston is seated, and the resistance of the spring 90, the piston 87 will not move until the piston 69 has been shifted to cause the brake shoe to engage the rail.

The pressure of fluid from pipe 78 then increases sufficiently to cause the piston 87 to move away from the seat rib 88 and the full area of the piston 87 being then exposed to the fluid pressure supplied through pipe 78, the piston is quickly shifted to its outer position, in which the circuit is closed from the current supply wire 95 to magnet coil 66. The magnetic brake shoe 65 is thus energized so that the brake shoe is pressed against the rail with a force corresponding with the current flow through the magnet coil 66.

When the piston 35 and the slide valve 38 are shifted to their outer positions, fluid under pressure in the sanding reservoir 17 flows through pipe and passage 52, valve cavity 80, and passage and pipe 81 to the ball check valve 13, causing the check valve to move to the right, so as to permit the fluid under pressure to flow to the sand traps (not shown) through pipe 14. It will thus be seen that the operation of the sand traps will be effected approximately simultaneously with the pneumatic and magnetic brake applications.

To effect the release of the brakes, the handle 22 of the brake switch device 6 is moved from service position to release position, thereby cutting off the supply of current to the magnet 41 of the magnet valve device 10.

When the magnet 41 is thus deenergized the spring 51, acting on the valve 43, seats said valve and unseats the valve 42, thereby venting the brake cylinder 15, the chamber 77 of the magnetic brake device 9, and the chamber 89 of the magnetic brake switch to the atmosphere in the manner heretofore described.

Fluid under pressure from the main reservoir 16 will then be supplied to the slide valve chamber 39, to the piston chamber 36, to the chamber 57 of the magnet valve device 11, and to the sanding reservoir 17.

When the fluid under pressure is released in pipe 78, the reduction in pressure in chamber 89 of the magnetic brake switch first causes the movement of piston 87, since the magnetic pull of the brake shoe 65 resists the upward movement of piston 69. The downward movement of piston 87 causes the switch contact 92 to move so as to open the circuit of the magnet coil 66 and the magnet coil being thus deenergized, the piston 69 is moved upwardly by the spring 72, thereby lifting the brake shoe 65 from the rail 67.

Should it be desired to operate the magnetic brake device 9 independently of the pneumatically operated brakes, the handle 82 of the valve device 8 is moved to register cavity 85 of the rotary valve 74 with ports 73 and 83, thereby establishing communication between pipes 20 and 34. The fluid under pressure in the main reservoir 16 is then permitted to flow through pipe 78 to the chamber 77 of the magnetic brake device 9, and also to the chamber 89 of the magnetic brake switch, the check valve 12 being shifted to the right so as to cut off the flow of fluid through pipe 18 to the brake cylinder 15.

When the pressure of the fluid in chamber 77 has been built up a predetermined amount, the piston 69 will be forced downwardly, in the manner heretofore described, to engage the shoe 65 with the rail 67, and the switch will be subsequently actuated to supply current to the magnet coil 66.

To effect the release of the magnetic brake shoe 65, the handle 82 of the valve device 8 is actuated to move the rotary valve 74 to the release position shown in Fig. 1, in which position the port 83 will be lapped and the chambers 77 and 89 will be vented to the atmosphere through pipe 78, check valve 12, pipe 20, port 73, rotary valve cavity 75, and exhaust port 76.

The reduction in fluid pressure in chamber 77 permits the spring 71 to move the piston 69 upwardly, thereby removing the brake shoe 65 from its engagement with the rail 67, the magnet coil 66 being deenergized by the downward movement of the piston 87 toward the seat rib 88, in the manner heretofore described.

The sand traps (not shown) which are connected to the pipe 14, may be operated at any time to sand the rails of the track, since in all rotative positions of the lever handle 22, said handle may be depressed and cause the contact disc 23 to bridge the contacts 24 and 25 and thus close the circuit to the magnet valve device 11.

Energization of the magnet 53 of the magnet valve device 11, seats the valve 54 and unseats the valve 55, and the fluid under pressure in the main reservoir 16 is permitted to flow to the pipe 14 connected to the sand traps (not shown), through pipe 34, chamber 57, bore 62, chamber 60, pipe 84, and check valve 13, causing the check valve to move to the left, so as to permit an unrestricted flow of fluid under pressure to the sand traps.

When the desired amount of sand has been released from the sand traps, the lever handle 22, can be raised so as to break the circuit to the magnet 53.

Deenergization of the magnet 53 permits the spring 63, acting on the valve 55, to seat said valve and unseat the valve 54, thereby cutting off the communication between chambers 57 and 60, and preventing further flow of the fluid from the main reservoir 16 to the pipe 14. Chamber 56 is open to the atmosphere through a port 99. Therefore, when the magnet 53 is deenergized and the valve 54 is unseated, as shown in Fig. 1, pipe 14 will be open to the atmosphere through check valve 13, pipe 84, chamber 60, bore 59, chamber 56 and port 99.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a fluid pressure brake, a magnetic brake, a valve device operative pneumatically to effect an application of both brakes, and a valve device operative electrically for controlling the actuation of said pneumatic valve device.

2. The combination with a fluid pressure brake apparatus, a magnet brake, a valve device operative pneumatically, and a valve device operative electrically for controlling the actuation of said pneumatic valve device to simultaneously apply both brakes.

3. The combination with a fluid pressure brake apparatus, a sand pipe, a magnetic brake, a valve device operative pneumatically, and a valve device operative electrically for controlling the actuation of said pneumatic valve device to simultaneously apply both brakes and supply fluid under pressure to said sand supply pipe.

4. The combination with a fluid pressure brake apparatus, a magnetic brake, a pneumatic valve device for controlling the actuation of both brakes, and a magnet valve device for controlling the operation of said pneumatic valve device.

5. The combination with a brake cylinder, a pneumatically actuated magnetic brake, means for supplying fluid under pressure to said brake cylinder and to said magnetic brake, and a magnet valve device for controlling the operation of said means 6. The combination with a fluid pressure brake apparatus and electro-pneumatic means for controlling the sanding of the rails, of electro-pneumatic means for effecting an application of the fluid pressure brake and for also controlling the sanding of the rails.

7. The combination with a fluid pressure brake apparatus and a magnetic brake, of electro-pneumatic means for effecting the operation of said magnetic brake and said fluid pressure brake apparatus, and fluid pressure means for separately effecting the operation of said magnetic brake.

8. The combination with a fluid pressure brake apparatus including a valve device operated by a variation in fluid pressure for supplying fluid under pressure to effect a fluid pressure application of the brakes and for sanding the rails, of a magnetic brake, means for effecting the simultaneous operation of said valve device and said magnetic brake, and means for effecting the operation of said magnetic brake independently of said valve device.

9. The combination with a fluid pressure brake apparatus including a valve device operated by a variation in fluid pressure for supplying fluid under pressure to effect a fluid pressure application of the brakes and for sanding the rails, of a magnetic brake, means for effecting the simultaneous operation of said valve device and said magnetic brake, and means for supplying fluid under pressure for sanding the rails independently of said valve device.

10. The combination with a valve device operative to supply fluid under pressure for effecting a fluid pressure application of the brakes and the supply of fluid under pressure for sanding the rails, of a magnetic brake, electro-pneumatic means for effecting the operation of said valve device and said magnetic brake, means for effecting the operation of said magnetic brake independently of said electro-pneumatic means, and means for supplying fluid under pressure for sanding the rails independently of said valve device.

11. The combination with a valve device operated by a variation in fluid pressure for effecting a fluid pressure application of the brakes and the supply of fluid under pressure for sanding the rails, of a magnetic brake device operated by a variation in fluid pressure, electro-pneumatic means for varying the fluid pressure on said valve device and said magnetic brake device, means for supplying fluid under pressure for sanding the rails independently of said valve device, and means for effecting the operation of said magnetic brake device independently of said electro-pneumatic means.

In testimony whereof I have hereunto set my hand, this 6th day of March, 1929.

JOSEPH C. McCUNE.